Patented Mar. 16, 1954

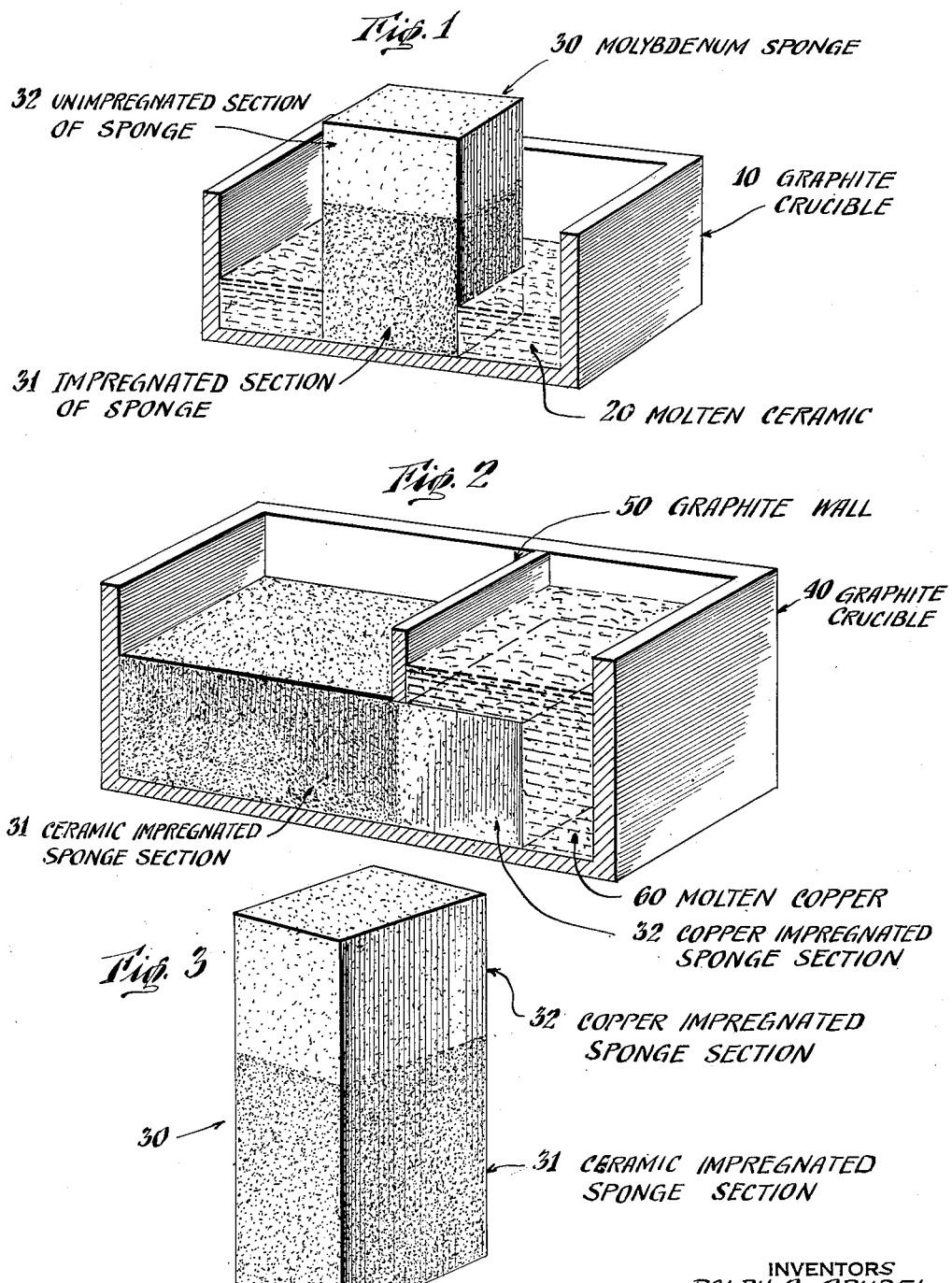

2,671,955

UNITED STATES PATENT OFFICE 2,671,955

COMPOSITE METAL-CERAMIC BODY AND METHOD OF MAKING THE SAME

Ralph O. Grubel and Lee S. Busch, Indianapolis, Ind., assignors to P. R. Mallory & Co., Inc., Indianapolis, Ind., a corporation of Delaware Application December 14, 1950, Serial No. 200,802

6 Claims. (Cl. 29—182.5)

This invention relates to composite solid bodies comprising two portions of widely different physical characteristics inseparably connected or bonded together and to a method of fabricating such bodies.

The present application is related to our copending application Ser. No. 200,801, filed December 14, 1950, and constitutes an improvement thereover. In the said application, we have disclosed and claimed metal-ceramic compositions comprising a porous metal base or sponge, the interconnected pores or voids of which are impregnated or filled with a suitable ceramic material. These metal-ceramic compositions combine the desired physical and chemical characteristics of the metallic and of the ceramic constituents in a single structure and are valuable for numerous practical applications where, for example, high strength at elevated temperatures and excellent resistance to thermal shock are required.

One of the difficulties experienced in connection with metal-ceramic bodies of the character described was that of fastening such bodies to other structural elements. In general, the metal-ceramics cannot be brazed, and are somewhat brittle so that conventional mechanical fastening methods are undesirable.

It is an object of the present invention to eliminate the foregoing difficulties experienced in the practical utilization of metal-ceramic compositions.

It is another object of the present invention to provide a composite body having portions of widely different characteristics, the said portions being permanently bonded together by means of a porous metallic matrix in common for both portions.

It is a further object of the invention to provide a composite solid body comprising two distinct divisions of an initially porous metallic base, one of said divisions being impregnated with a ceramic material and the other of said divisions being impregnated with a metal.

The invention also contemplates a method of fabricating composite bodies of the character described on a practical and industrial scale at a low cost.

Other and further objects and advantages of the invention will become apparent from the following description, taken in conjunction with the accompanying drawing, in which:

Fig. 1 is a sectional view, somewhat diagrammatic and fragmentary in character of an arrangement suitable for carrying out the first impregnation step of the method of the invention;

Fig. 2 is a similar view of an arrangement suitable for carrying out the second impregnating step of the method of the invention; and Fig. 3 is a perspective view of a composite solid body embodying the invention.

Broadly stated, in accordance with the principles of the present invention, there is provided a composite solid body in which there are united different materials, each intended to serve a different function for which the other is not suited. More specifically, the invention permits the union of a ductile component with a brittle body of the impregnated sponge or of the metal-ceramic type, to facilitate fastening or to improve the functional versatility of the brittle material.

The product and the method of the invention involves the combination of three different materials. One of the said materials is common to both divisions or portions of the composite body, each of the other two materials, combined with the common material, constitute one of the component divisions of the body. The material common to both divisions is made into a porous base or sponge by compacting and sintering the powdered material. One section of this base or sponge is impregnated with the second material to form one division of the body. The remaining section of the sponge is impregnated with the third material to form the other division.

One of the unique features of the invention resides in the manner of effecting the first impregnation to keep the second section of the sponge from being contaminated by the first impregnant. To accomplish this, the sponge is set in the material to be impregnated first in such a way that the portion to be left unimpregnated is at the top. Thus, when these materials are heated sufficiently beyond the melting point of the first impregnant, the said impregnant will enter the sponge and climb above the liquid level by capillary action, forming the first division of the body. The section of the sponge above the point to which the first impregnant has risen, is left unimpregnated for the subsequent impregnation by the second impregnant. This is caused to impregnate the remainder of the sponge by heating beyond the melting point of the second impregnant and forms the second division of the body. Preferably, contact of the first already impregnated portion of the body with the second impregnant is prevented during the second impregnating step to avoid surface contamination thereof by the said second impregnant.

The preferred form of the method of the invention just described imposes certain conditions to which the materials must conform. The sponge material must be wet by the two impregnant materials when they are in the molten state. The two impregnants should have little, or no, solubility in the sponge material. Furthermore, the material used for the sponge must have a melting point above the temperature used for the first impregnation and the material used as the first impregnant must have a melting point above the temperature used for the second impregnation.

The porous base or sponge may be formed by powder metallurgical procedures from any one of the metals, metal borides, carbides or nitrides disclosed in our above-mentioned copending application Ser. No. 200,801, such as, for example, molybdenum, tungsten, titanium, dimolybdenum carbide, tungsten carbide, and the like. The powdered metal or metallic material may be mixed with a pore-forming agent, such as ammonium bicarbonate, in amounts up to 20% by weight and compacted into a briquette at a pressure of 2.5 to 15 tons per square inch to give a grain density from 2.5 to 5 gms./cm.$^3$. Of course, the addition of a pore-forming agent may be omitted where only a moderate porosity is desired. The compacts are then sintered in a reducing or in a neutral atmosphere, or in vacuum, for 15 to 60 minutes at a temperature which may be between 1500° and 1700° C. It will be readily appreciated, however, that the sintering conditions, such as the time and temperature of sintering, depend on the specific materials used for the sponge.

The first impregnant is preferably a ceramic material of the type disclosed in our copending application comprising one or more of the following metal oxides as the major constituents: aluminum oxide, beryllium oxide, calcium oxide, lead mono-oxide, lithium oxide, magnesium oxide, silicon oxide, titanium dioxide and zirconium oxde. The impregnation may be carried out at a temperature from 100° to 500° C. above the melting point of the ceramic but below the melting point of the porous base or sponge in a suitable protective atmosphere, such as in argon. This first impregnating step may be completed within 10 to 30 minutes and is carried out in such a manner that one end or edge of the sponge remains unimpregnated by the ceramic. This is accomplished by causing the section of the sponge, which is desired to be initially free from impregnation, to extend above the level of the molten ceramic, allowing for a rise of the ceramic of up to 1½" into the protruding section of the sponge as a result of capillary action.

The second impregnant is preferably a ductile metal having a melting point below that of the ceramic impregnant and capable of being readily brazed. Examples of suitable metals are copper, silver or copper-base and silver-base alloys. The second impregnation step is carried out in a protective (inert or reducing) atmosphere by placing the corresponding section of the sponge in a container with the metal or alloy and heating at 100° to 500° C. above the melting point of the metal, but below the melting point of the first impregnant, for 10 to 20 minutes. The times necessary for the completion of each of the impregnation steps obviously depend upon the thickness of the section to be penetrated and the viscosity of the molten impregnant. The impregnating times hereinabove given relate to pieces about 1" thick.

In order that those skilled in the art may have a better understanding of the invention, the following illustrative example may be given with specific reference to the manufacture of a composite body comprising a molybdenum-ceramic portion and a molybdenum-copper portion. The molybdenum-ceramic material would find use in applications where high strength at elevated temperatures and great resistance to thermal shock are required. However, the fastening of parts made from this material to other structural parts would present a problem since the material cannot be brazed and its brittleness is detrimental to mechanical fastening methods. Therefore, the combination of a molybdenum-copper component with the molybdenum-ceramic body would facilitate mechanical fastening and would also permit the use of brazing as a means of anchoring the part.

The following example relates to the fabrication of a composite body embodying the invention in which the sponge material was molybdenum, the melting point of which is 2620° C. The first impregnant was the ceramic $5CaO.3Al_2O_3$ having a melting point of 1455° C. and the second impregnant was copper having a melting point of 1083° C.

*Example*

The molybdenum powder was dried and sieved minus 200. It was mixed with dry, minus 200 sieve ammonium bicarbonate in the ratio 80% Mo and 20% $NH_4HCO_3$ by weight. The ammonium bicarbonate served as a pore-forming agent which was driven off during the sintering of the sponge. The powder mix was pressed at a pressure of 2.5 tons per square inch into a briquette of 3.0 gms./cm.$^3$ density. This briquette was sintered at 1500° C. for 30 minutes in a reducing atmosphere of dissociated ammonia gas.

The ceramic compound was minus 10 sieve. It was placed in a graphite crucible and surrounded the lower portion of the molybdenum sponge. The quantity of ceramic was calculated so that 2" of the sponge would extend above the molten ceramic when the ceramic had melted. The crucible was placed in a furnace having an argon atmosphere and heated to a temperature in the range between 1700° and 1750° C. It was held at this temperature for 15 minutes as determined by the thickness of the section to be impregnated, which was 1". The ceramic rose in the sponge about 1¼" above the liquid level. When it had cooled, the excess ceramic was ground or otherwise cleaned off the piece.

This impregnating technique and the arrangement of the components is illustrated in Fig. 1 of the drawing, in which reference numeral 10 denotes the graphite crucible and 20 the bath of molten ceramic. Reference 30 generally denotes the molybdenum sponge, the lower portion 31 of which is submerged in the molten ceramic and becomes impregnated to a level above that of the ceramic, while its upper portion 32 remains unimpregnated.

To impregnate the remaining sponge with copper, the piece was placed in a graphite crucible or boat and blocked with graphite to form a well for copper shot. This charge was then heated to 1200° C. for 10 minutes in a protective (non-oxidizing or reducing) atmosphere to melt and to impregnate the copper. The excess copper was removed after it had cooled. This arrangement is shown in Fig. 2 in which reference numeral 40 denotes the graphite boat, 50 the graphite wall preventing contact of the ceramic-impregnated portion of the sponge with the molten bath of copper 60. As in Fig. 1, reference 31 designates the ceramic-impregnated portion and 32 the copper-impregnated portion of the sponge.

Fig. 3 illustrates the finished composite product 30, comprising the ceramic-impregnated portion 31 and the copper-impregnated portion 32, the said portions being inseparably bonded together by means of the molybdenum sponge in common for both portions.

Although the present invention has been described in conjunction with a few preferred embodiments, variations and modifications may be restorted to as those skilled in the art will readily understand. Such variations and modifications are considered within the purview of the specification and the scope of the claims.

What is claimed is:

1. A composite body having a relatively brittle portion and a relatively ductile portion comprising a sponge of refractory metal constituting a continuous matrix of high thermal and electrical conductivity, ceramic material essentially composed of metal oxides and having a melting point lower than that of the sponge metal substantially filling out the voids of a portion of said matrix and fusion-bonded thereto, and ductile impregnating metal having a melting point lower than that of said ceramic material substantially filling out the voids of the remainder of said matrix and fusion-bonded thereto, said ceramic material and said impregnating metal being substantially insoluble in said matrix metal.

2. A composite body having a relatively brittle portion and a relatively ductile portion comprising a molybdenum sponge, ceramic material essentially composed of metal oxides and having a melting point lower than that of molybdenum substantially filling out the voids of a portion of said sponge and fusion-bonded thereto, and impregnating metal selected from the group consisting of copper, silver, copper base, and silver base alloys having a melting point lower than that of said ceramic material substantially filling out the voids of the remainder of said sponge and fusion-bonded thereto.

3. A composite body having a relatively brittle portion and a relatively ductile portion comprising a molybdenum sponge, a ceramic material having substantially the composition $5CaO.3Al_2O_3$ impregnating a portion of said sponge, and copper impregnating the remainder of said sponge.

4. The method of making composite bodies which comprises submerging a portion of a porous metal base in a molten bath of a first impregnant constituted of a ceramic material essentially composed of metal oxides and having a melting point lower than that of the base metal to cause substantially complete impregnation of the base to a level above that of the said bath by capillary action, submerging the unimpregnated remainder of said base in a molten bath of a second impregnant constituted of a metal having a melting point lower than that of said ceramic material to cause substantially complete impregnation of such remainder, said impregnants having, when in the molten state, negligible solubility in the base metal and being adapted to wet said base metal, and carrying out the second impregnating step under such conditions that contact between the bath of second impregnant and the portion of the base already impregnated with the first impregnant is prevented.

5. The method of claim 4 wherein the porous metal base is in the form of a sintered body of compressed particles selected from the group consisting of metals exhibiting refractory properties, borides, carbides and nitrides of such metals.

6. The method of making composite bodies which comprises submerging a portion of a porous base of molybdenum in a molten bath of a ceramic material essentially composed of metal oxides and having a melting point lower than that of molybdenum but higher than that of copper to cause substantially complete impregnation of said base by capillary action to a level above that of said bath, submerging the unimpregnated remainder of said base in a molten bath of copper to cause substantially complete impregnation of such remainder with copper, and carrying out the copper impregnation step under such conditions as to prevent contact between the copper bath and the portion of the base already impregnated with ceramic material.

RALPH O. GRUBEL.
LEE S. BUSCH.

References Cited in the file of this patent

UNITED STATES PATENTS

| Number | Name | Date |
| --- | --- | --- |
| 2,066,176 | Girvin et al. | Dec. 29, 1936 |
| 2,370,242 | Hensel | Feb. 27, 1945 |
| 2,518,253 | Reis | Aug. 8, 1950 |

OTHER REFERENCES

Chem. and Eng. News, vol. 26, No. 45, November 8, 1948, pp. 33662–63.